United States Patent [19]

Fenton et al.

[11] Patent Number: 4,508,537
[45] Date of Patent: Apr. 2, 1985

[54] METHOD FOR REMOVING ELEMENTAL SULFUR PARTICLES FROM THE AQUEOUS WASHING SOLUTION OF A HYDROGEN SULFIDE REMOVAL PROCESS

[75] Inventors: Donald M. Fenton, Anaheim; Dennis D. Delaney, Placentia; F. Emmett Bingham, Mission Viejo, all of Calif.

[73] Assignee: Union Oil Company of California, Brea, Calif.

[21] Appl. No.: 453,501

[22] Filed: Dec. 27, 1982

[51] Int. Cl.³ .............................................. C01B 17/04
[52] U.S. Cl. .................... 23/293 S; 423/224; 423/226; 423/567 R; 423/573 R
[58] Field of Search .................... 209/164–167; 23/293 S, 308 S, 294 S; 423/224, 567 R, 571, 573 R, 578 R, 226; 252/61

[56] References Cited

U.S. PATENT DOCUMENTS

| | | | |
|---|---|---|---|
| 4,002,721 | 1/1977 | Guffy et al. | 423/226 |
| 4,208,385 | 6/1980 | Robbins et al. | 423/226 |
| 4,243,648 | 1/1981 | Fenton | 423/573 R |
| 4,344,863 | 8/1982 | Robbins et al. | 423/226 |
| 4,393,037 | 7/1983 | Delaney et al. | 423/573 R |
| 4,401,642 | 8/1983 | Blytas et al. | 423/224 |

FOREIGN PATENT DOCUMENTS 682446 9/1979 U.S.S.R. .............................. 23/393 S
880453 11/1981 U.S.S.R. .............................. 423/573 R

OTHER PUBLICATIONS

"Refiners Focus on Sulfur Recovery", *Oil & Gas Journal,* Jun. 28, 1982.
"First Commercial Test is Successful for Catalytic Hydrogen Sulfide Oxidation Process", A. J. Cabodi, H. R. Van, and L. C. Hardison, *Oil & Gas Journal,* Jul. 5, 1982.

*Primary Examiner*—Benoit Castel
*Attorney, Agent, or Firm*—Dean Sandford; Gregory F. Wirzbicki; Denton L. Anderson

[57] ABSTRACT

A method is provided for removing elemental sulfur particles from a hydrogen sulfide removal process which employs a regenerable, aqueous washing solution capable of absorbing hydrogen sulfide from an industrial gas stream and converting that hydrogen sulfide to elemental sulfur. The washing solution of such a process is contacted with bubbles of an oxygen-containing gas while in the presence of controlled concentrations of a selected hydrocarbon and a selected surfactant.

26 Claims, 1 Drawing Figure

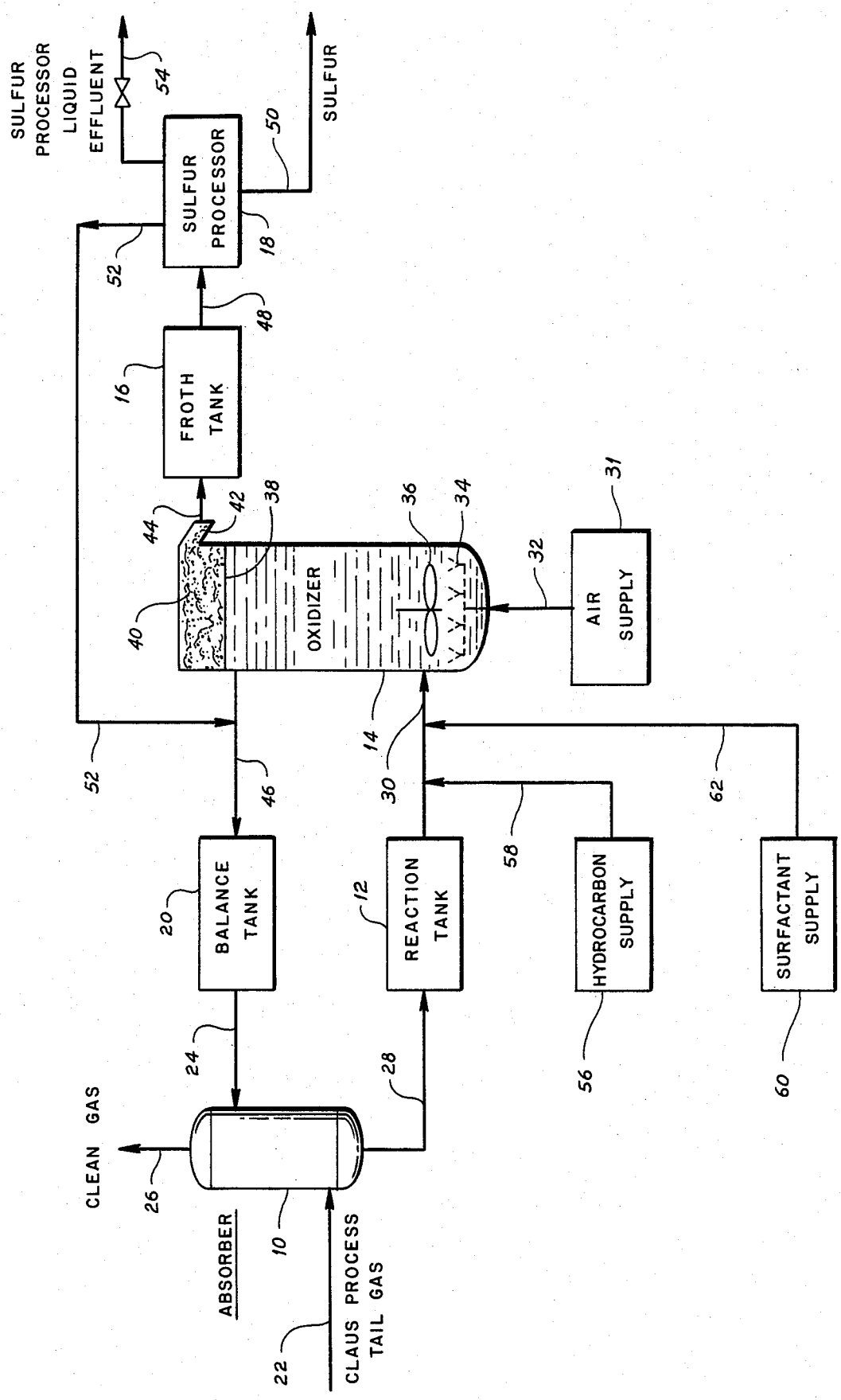

METHOD FOR REMOVING ELEMENTAL SULFUR PARTICLES FROM THE AQUEOUS WASHING SOLUTION OF A HYDROGEN SULFIDE REMOVAL PROCESS

BACKGROUND OF THE INVENTION

The present invention relates generally to the removal of hydrogen sulfide from gas streams by contacting such streams with a regenerable, aqueous washing solution. More particularly, the present invention relates to the removal of sulfur particles from the washing solutions of hydrogen sulfide removal processes wherein absorbed hydrogen sulfide is converted to elemental sulfur.

With the increasing need for society and industry to coexist in close proximity to one another, industry is asked to produce increasingly pollution-free products in an increasingly non-polluting manner. A particularly nettlesome problem in this regard is that posed by the need to isolate and dispose of the toxic and highly odoriferous gas, hydrogen sulfide, a pollutant found in gas mixtures produced by a variety of important industrial operations (e.g., petroleum production and refining, the destructive distillation of coal, and oil shale, the gasification and liquefaction of coal, the generation of electrical power from geothermal steam, etc.).

Several processes have been developed in an effort to solve this problem. Among the most attractive of these processes are those which employ a regenerable, aqueous washing solution capable of absorbing hydrogen sulfide from an industrial gas stream and converting that hydrogen sulfide to elemental sulfur, a material which is not only relatively innocuous to the environment but also easily stored and valuable as a chemical raw material. Processes of this type are exemplified by the Stretford process wherein a pentavalent vanadium-containing washing solution is used to contact a sour gas stream and absorb hydrogen sulfide therefrom, and wherein the absorbed hydrogen sulfide is oxidized to elemental sulfur by the overall reaction:

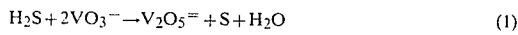

$$H_2S + 2VO_3^- \rightarrow V_2O_5^= + S + H_2O \tag{1}$$

The washing solution is thereafter regenerated for recycle by the removal of the elemental sulfur and by the reoxidation of the vanadium, usually with air via the reaction:

$$2V_2O_5^= + O_2 \rightarrow 4 VO_3^- \tag{2}$$

A problem which has plagued the operators of such hydrogen sulfide removal processes is the difficulty in efficiently removing elemental sulfur particles from the circulating washing solution. Inefficient sulfur particle removal causes an unwanted buildup in the concentration of such particles within the washing solution. This buildup leads to a variety of problems. First of all, an increase in sulfur particle concentration increases the mass of the washing solution, causing an increase in pumping expenses. Also, as the particle concentration increases, some of the particles fall out of the washing solution and deposit within the circulating equipment. This deposition causes partial plugging of the circulating equipment, thereby further increasing pumping costs and often forcing a shutdown of operations. Furthermore, large quantities of circulating sulfur particles cause significant problems with corrosion and erosion of the circulating equipment. Finally, high concentrations of circulating sulfur particles cause accelerated chemical degradation of the washing solution since elemental sulfur reacts with various washing solution constituents to form nonregenerable contaminant salts.

It is known and is commonly practiced among designers and operators of hydrogen sulfide removal processes of the type described above to attempt the removal of elemental sulfur particles from the washing solution by circulating the washing solution through a tank-like oxidizer vessel wherein air is bubbled up from the bottom. With fresh, unused washing solutions, the attempt is fairly successful. The elemental sulfur particles, which when initially formed are about 1 to 5 microns in size, agglomerate to form sulfur clumps of 10 to 150 microns. These clumps are buoyed by the air bubbles to the surface of the liquid where they interact to form a sulfur-rich froth which rises above the liquid surface toward the top of the vessel. Near the top of the vessel the froth overflows through a weir-like opening and is collected in a tank-like sulfur froth collection vessel. From this collection vessel the sulfur-rich material is pumped to a sulfur separating device such as a filter, a centrifuge or an autoclave wherein the remaining amounts of entrained washing solution are separated from the elemental sulfur product.

After a washing solution has been in use for a period of time, however, the attempted removal of sulfur particles with air bubbles alone is often less than totally successful. This is believed to result from the buildup in used washing solutions of contaminant salts such as sulfates, thiosulfates, colloidal metal oxysulfides, and, in Stretford process systems, anthraquinone disulfonic acid oxidation products. These salts are believed to electrochemically inhibit the 1 to 5 micron sulfur particles from agglomerating into larger sulfur clumps. The 1 to 5 micron particles are not easily buoyed to the surface by bubbled air and so tend to stay suspended in the washing solution. The contaminant salts are also believed to electrochemically inhibit those sulfur particles which do find their way to the surface from interacting to form a sulfur-rich froth. Instead of forming a froth, the particles often form a large-bubbled foam which is relatively high in air and liquid content and relatively low in sulfur content. The presence of 1 to 5 micron sulfur particles exacerbates the foaming tendency of an older washing solution, as does the inadvertent introduction into the washing solution of small quantities of light hydrocarbons. Foam is a very poor vehicle for transferring sulfur out of the oxidizer vessel. Hence an inordinate quantity of the sulfur particles is not removed from the system but continue to circulate with the washing solution.

There is, therefore, a need for more efficient techniques for the removal of sulfur particles from the regenerable aqueous washing solutions of those hydrogen sulfide removal processes wherein hydrogen sulfide is converted into elemental sulfur.

Consequently, a primary object of this invention is to provide a novel and superior method for removing elemental sulfur particles from such washing solutions.

Another object of this invention is to provide a novel and superior method for creating and maintaining a stable, sulfur-rich froth above oxidizer vessels employed in such hydrogen sulfide removal processes.

A further object of this invention is to provide a novel and superior method for minimizing the foaming tendency of such aqueous washing solutions.

A still further object of this invention is to provide a novel and superior method for agglomerating fine sulfur particles within such aqueous washing solutions.

A still further object of this invention is to provide a novel and superior method for reducing the concentration of elemental sulfur particles in such circulating aqueous washing solutions and for maintaining such concentrations at low levels.

A still further object of this invention is to provide a novel and superior method for removing deposits of elemental sulfur from the internals of processing equipment used in such hydrogen sulfide removal processes such as pumps, lines, vessels, absorbers, etc.

SUMMARY OF THE INVENTION

In accordance with the present invention, an improved method is provided for removing elemental sulfur particles from a hydrogen sulfide removal process which employs a regenerable, aqueous washing solution capable of absorbing hydrogen sulfide from an industrial gas stream and converting that hydrogen sulfide to elemental sulfur. The method comprises contacting the washing solution of such a hydrogen sulfide removal process with bubbles of an oxygen-containing gas within an oxidizer vessel which also contains a selected hydrocarbon and a selected surfactant.

The selected hydrocarbon is a single compound or a mixture of compounds, consists essentially of carbon and hydrogen, has a distillation curve with a 90 percent point less than about 680° F. and has a flash point greater than about 100° F.

The selected surfactant is essentially nonionic and has a first functional component which is partially soluble in water and a second functional group which is partially soluble in the selected hydrocarbon. The ratio of the volumetric concentration within the oxidizing vessel of the selected surfactant to that of the selected hydrocarbon is between about 7:1 and about 1:7.

The method of this invention increases the tendency of sulfur particles within the washing solution to agglomerate into larger, more easily buoyed particles, increases the stability and the sulfur concentration of froth over the liquid surface within the oxidizer vessel, decreases the foaming tendency of the washing solution, reduces the concentration of elemental sulfur within the washing solution and tends to remove sulfur deposits from within the washing solution circulation equipment.

BRIEF DESCRIPTION OF THE DRAWING

The present invention will be more readily understood by reference to the drawing in which is depicted an exemplary hydrogen sulfide removal system with which the present invention can be used to advantage.

DETAILED DESCRIPTION OF THE INVENTION

The sulfur recovery method of this invention is suitable for use in a wide variety of sulfur removal processes which employ a regenerable, aqueous washing solution capable of absorbing hydrogen sulfide and converting it to elemental sulfur. Although, for illustrative purposes, the method is hereinbelow described in particular respect for use in a Stretford process system such as is described in U.K. Patent Specification No. 948,270 issued to Nicklin et al., it is to be understood that the method is not limited thereto.

In a preferred embodiment, the process comprises an absorber vessel 10, reaction tank 12, oxidizer vessel 14, froth tank 16, sulfur processor 18 and balance tank 20. In the description set forth below, it will be assumed that the process utilizes an aqueous washing solution comprising, inter alia, solubilized vanadium and sodium carbonate and/or bicarbonate.

A hydrogen sulfide-containing industrial gas stream, for example a Claus process tail gas stream containing between about 0.5 and about 5.0 mole percent of hydrogen sulfide, flows into the lower regions of absorber vessel 10 through conduit 22 and flows upwardly toward the top of absorber vessel 10. From balance tank 20, regenerated aqueous washing solution flows into the upper regions of absorber vessel 10 through conduit 24 and gravitates downwardly toward the bottom of absorber vessel 10. Absorber vessel 10 is internally configured so as to cause the upwardly flowing gas stream to contact the downwardly gravitating washing solution. Alternatively, one or more venturi or other gas-liquid contacting apparatus may be employed in conjunction with, or in replacement of, absorber vessel 10. As a result of the aforementioned gas-washing solution contact, essentially all of the hydrogen sulfide is extracted from the gas stream and is absorbed into the washing solution.

The absorption of hydrogen sulfide by the washing solution is facilitated by the reaction of the hydrogen sulfide with sodium carbonate in the washing solution to form sodium hydrosulfide according to the following reaction:

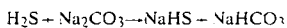

In turn, the sodium hydrosulfide is oxidized to elemental sulfur by the water-soluble vanadate in the solution according to the reaction:

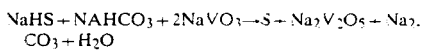

The aforementioned industrial gas stream, after being essentially stripped of hydrogen sulfide in absorber vessel 10, is removed from the top of absorber vessel 10 through conduit 26. The washing solution is discharged from the bottom of absorber vessel 10 through conduit 28 into reaction tank 12 wherein the chemical conversion of the hydrogen sulfide to elemental sulfur is completed. The washing solution residence time in absorber vessel 10 and reaction tank 12 typically varies between about 10 and about 15 minutes.

The sulfur-containing washing solution is caused to flow from reaction tank 12 through conduit 30 into the lower regions of oxidizer vessel 14. An oxygen-containing gas, preferably air, is injected into the bottom of oxidizer vessel 14 from air supply 31 via conduit 32, and is preferably churned into a large number of small bubbles by air distributors 34 and/or by rotating stirrer-mixer 36 located above the air inlet. The air bubbles rise through the washing solution in oxidizer vessel 14, and in so doing, reoxidize the washing solution. Specifically, the vanadium in the washing solution, which by reaction (2) had been reduced from its pentavalent state to a tetravalent state ($V^{+5}$ to $V^{+4}$), is reoxidized to its original pentavalent state by the reaction:

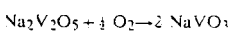

In addition to the reoxidation of solution vanadium, the air bubbles in oxidizer vessel 14 tend to buoy particles of elemental sulfur to surface 38 of the liquid within oxidizer vessel 14. At liquid surface 38, the sulfur particles tend to form a tiny-bubbled froth 40 which rises above surface 38 towards the top of oxidizer vessel 14. Near the top of oxidizer vessel 14, froth 40 overflows wier 42 and flows into froth tank 16 via conduit 44. As more fully described below, the controlled addition to the washing solution of a selected hydrocarbon and a selected surfactant greatly enhances the efficiency of the gathering of sulfur particles in oxidizer vessel 14 and the transferring of those sulfur particles to froth tank 16.

From oxidizer vessel 14 the bulk of the washing solution, now reoxidized and purged of elemental sulfur particles, is recycled through conduit 46 back to balance tank 20.

From froth tank 16 the concentrated elemental sulfur particle-washing solution mixture is discharged through conduit 48 into sulfur processor 18. As more fully set forth in U.S. Pat. No. 4,325,936 issued to Gowdy and Fenton, the disclosure of which is incorporated herein by reference, sulfur processor 18 can be an autoclave, a centrifuge, a filter, some other physical separator, or a combination of such equipment. Within sulfur processor 18, the particles of elemental sulfur are separated from the washing solution and then drawn off to a product sulfur storage facility (not shown) through conduit 50. All or a part of the washing solution recovered in sulfur processor 18 is recycled to balance tank 20 via conduits 52 and 46. Often a small portion of the washing solution is removed from circulation to a disposal facility (not shown) via conduit 54.

In accordance with this invention, a small amount of a selected hydrocarbon is injected into the washing solution from source 56 via conduit 58, and a small amount of a selected surfactant is injected into the washing solution from source 60 via conduit 62. Both the selected hydrocarbon and the selected surfactant can be injected at any convenient location along the washing solution circulation system, but preferably both are injected between reaction tank 12 and oxidizer vessel 14.

When added in proper proportions and quantities, the selected hydrocarbon and the selected surfactant greatly increase the tendency of the sulfur particles to agglomerate into larger, more easily buoyed particles, greatly increase the stability and the sulfur concentration of the froth within oxidizer vessel 14, and greatly decrease the foaming tendency of the washing solution. Furthermore, the selected hydrocarbon and surfactant reduce the concentration of entrained sulfur particles in the circulating washing solution and reduce pre-existing sulfur plugging within circulating system equipment.

The selected hydrocarbon consists essentially of molecules of carbon and hydrogen. It can be a single compound or a mixture of compounds. At least 90 percent of its volume should vaporize when heated at atmospheric pressure to about 680° F., but it should not be capable of being ignited at atmospheric pressure unless heated above about 100° F. Stated in terms of industrially recognized analytical methods, the selected hydrocarbon has a distillation curve when tested pursuant to ASTM Method D86 with a 90 percent point of 680° F. or lower and has a flash point when tested pursuant to ASTM Method D93 of 100° F. or higher. Preferably, the selected hydrocarbon is comprised of a substantial proportion of aliphatic molecules. Common mixtures of hydrocarbons such as those sold as diesel fuel, fuel oil No. 2 and kerosene have been found to be suitable for purposes of this invention. The most preferred hydrocarbons for purposes of this invention are diesel fuel oils and, especially, No. 2-D diesel fuel oil as defined by ASTM Designation D-975-81 ("Standard Specification for Diesel Fuel Oils"), which is incorporated herein by reference in its entirety.

The selected surfactant used in this invention is essentially nonionic and has a first functional component which is partially soluble in water and a second functional component which is partially soluble in the selected hydrocarbon. Preferably, the selected surfactant is also comprised of compounds selected from the class of surfactants which:

(1) are substantially stable at the conditions existant within the washing solution;

(2) are substantially innocuous to the oxidation of hydrogen sulfide to sulfur;

(3) are substantially innocuous to the regeneration of the washing solution with oxygen;

(4) are substantially innocuous to the recovery of product sulfur;

(5) are substantially nonreactive or decomposable within the washing solution except in cases where essentially all products of such reaction and/or decomposition are substantially innocuous to the environment and substantially innocuous to said hydrogen sulfide removal system.

As used herein, the phrase "innocuous to the environment" means: will not cause or significantly contribute to air pollution problems or to liquid waste disposal problems. The phrase "innocuous to the hydrogen sulfide removing system," as used herein, means: will not interfere with the oxidation of hydrogen sulfide to sulfur, will not interfere with the regeneration of the washing solution with oxygen, will not interfere with the recovery of product sulfur, and will not in practice accumulate within the washing solution to the point where such accumulation interferes with the oxidation of hydrogen sulfide, the regeneration of the washing solution or the recovery of product sulfur.

Suitable surfactants include polyoxyethylene condensates represented by the following general formula:

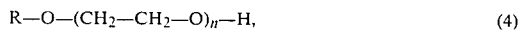

$$R-O-(CH_2-CH_2-O)_n-H, \qquad (4)$$

wherein R is the residue of a fatty alcohol, acid, amide, or amine having from about 10 to about 18 carbon atoms or an alkyl phenol having from about 10 to about 18 carbon atoms; and where n is an integer of 1 or above and preferably between about 5 and about 30. Some specific examples of polyoxyethylene condensates which can be used are polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene thioethers such as polyoxyethylene n-dodecyl thioether.

Some other examples of polyoxyethylene ether compounds are polyoxyethylene nonylphenyl ether having a cloud point of between 126° and 133° F. and marketed under the trademark "Igepal CO-630" and a polyoxyethylene nonylphenol ether having a cloud point above 212° F. and marketed under the trademark "Igepal CO-887." A similar polyoxyethylene nonylphenyl ether having a cloud point of about 86° F., marketed under the trademark "Igepal CO-610," is also a good surfactant. "Igepals" are marketed by GAF Corporation. Other suitable surfactants include a polyoxyethylene octylphenyl ether having a cloud point of between 80° F. and 160° F. and marketed by Rohm and Haas Company under the trademark "Triton X-100" and a polyoxyethylene lauryl ether having a cloud point above 190° F. and manufactured by ICI Americas, Inc. under the trademark "Brij 35."

The nonionic surfactants which can be used also include a group of compounds marketed by BASF Wyandotte Corporation under the trademark "Pluronic." A "Pluronic" compound has the following general formula:

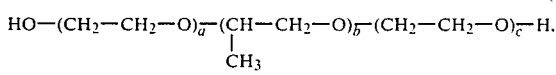

(5)

wherein a, b and c are integers between about 1 and about 100. As the ratio of b to a and c increases, the compounds become less water soluble and more oil soluble, and thus more hydrophobic; in contrast, as the ratio of b to a and c decreases, the compounds become more water soluble and less oil soluble, and thus more hydrophilic. An example of this group of compounds is "Pluronic L-61" which has a polyoxypropylene chain having a molecular weight of about 1,500 to 1,800 and a polyoxyethylene content that is about 5 to 15 percent of the total weight of the molecule. Another example is "Pluronic L-64" which has a polyoxypropylene chain having a molecular weight of about 1,500 to 1,800 and a polyoxypropylene content that is about 35 to 45 percent of the total weight of the molecule. Still another useful example is "Pluronic L-81" which has a polyoxypropylene chain having a molecular weight of about 2,100 to 2,600 and a polyoxypropylene content that is about 5 to 15 percent of the total weight of the molecule. These compounds may be considered to be block co-polymers of propylene and ethylene oxides.

Still another series of suitable surfactants that can be used are ethylene oxide adducts of acetylenic glycols marketed by Air Products & Chemicals, Inc. under the trademark "Surfynol." "Surfynols" can be represented by the following general formula:

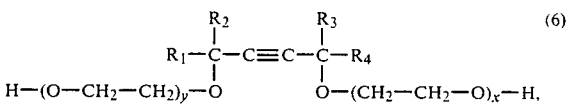

(6)

in which $R_1$ and $R_4$ are the same or different alkyl radicals containing from about three to about 10 carbon atoms, $R_2$ and $R_3$ are independently selected from the group consisting of methyl and ethyl, and x and y are integers whose sum is in the range of about 3 to about 60.

Representative of the "Surfynols" is "Surfynol 365," which is an ethylene oxide adduct of 2,4,7,9-tetramethyl decynediol containing an average of 10 moles of ethylene oxide per mole of the surfactant. "Surfynol 485" corresponds to "Surfynol 465" but contains an average of 30 moles of ethylene oxide per mole of surfactant. "Surfynol 485" has a cloud point above 212° F.

The concentrations of the selected hydrocarbon and surfactant within oxidizer vessel 14 are controlled to maintain an upwardly rising froth above washing solution surface 38 which contains at least 3 percent sulfur by weight. It will be appreciated that the optimum concentrations of the selected hydrocarbon and surfactant within oxidizer vessel 14 will depend on operating conditions unique to each individual plant (such as oxidizer vessel gas rate, the type of selected hydrocarbon used, the type of surfactant used, the concentration of the various chemical constituents of the washing solution, including contaminants, the temperature of the washing solution, the pH of the washing solution, etc.).

Typically, the concentration of the selected hydrocarbon within oxidizer vessel 14 is between about 2 and about 200 ppmv. Preferably, the concentration is between about 10 and about 100 ppmv, and, more preferably, is between about 10 and about 50 ppmv.

Likewise, the concentration of the selected surfactant within oxidizer vessel 14 is typically between about 2 and about 200 ppmv. Preferably, the concentration is between about 10 and about 100 ppmv, and, more preferably, is between about 10 and about 50 ppmv.

The concentrations of the selected hydrocarbon and the selected surfactant within oxidizer vessel 14 should, preferably, be sufficient to cause the elemental sulfur particles to form a froth above the washing solution surface having at least 3 percent sulfur by weight. If the concentration of selected surfactant within oxidizer vessel 14 is too small with respect to the concentration of selected hydrocarbon, the washing solution will not form a stable sulfur-rich froth above liquid surface 38. Instead the washing solution will form an instable, sulfur-lean foam. If the concentration of selected surfactant is too large with respect to the concentration of selected hydrocarbon, the washing solution will also not form a stable, sulfur-rich froth above the liquid surface. In fact, nothing will form above the liquid surface and no sulfur will be transported to froth tank 16. The volumetric ratio of the selected surfactant to the selected hydrocarbon within oxidizer vessel 14 must be between about 7:1 and about 1:7, preferably between about 5:1 and 1:5 and, more preferably, between about 2:1 and 1:2.

Since some of the selected hydrocarbon and surfactant will be carried out of oxidizer vessel 14 with the sulfur froth, the selected hydrocarbon and surfactant must be continuously or periodically added to oxidizing vessel 14. Typically, the rates at which both the hydrocarbon and surfactant additives must be continuously replenished will be between about 10 and about 200 milliliters of each additive per thousand pounds of sulfur removed from oxidizing vessel 14.

As stated above, it is preferred that the addition of the selected hydrocarbon and surfactant be made between reaction tank 12 and oxidizer vessel 14. Since the effects of the invention are seen principally in oxidizer vessel 14, adding the chemicals immediately upstream thereto allows the practitioner to quickly assess the effects of various addition rates without having to wait out lag times. The selected hydrocarbon and surfactant of this invention can be added as a combined mixture, but it is preferred to meter each separately so as to maximize flexibility.

To free up and capture sulfur which has deposited on the bottom of oxidizer vessel 14 and balance tank 20, an air lance can be used to blow the deposited sulfur off the vessel bottoms.

EXAMPLE 1

Five hundred milliliters of a used aqueous Stretford process washing solution is placed into a 1,000 ml. graduated cylinder. The washing solution contains about 6.5 weight percent elemental sulfur in particulate form. The washing solution also contains dissolved chemicals, the concentrations of some of which are set forth in TABLE I:

TABLE I

| Dissolved Chemical | Approximate Concentration, grams/liter |
|---|---|
| V | 3 |
| Anthraquinone Disulfonic Acid (ADA) | 2.1 |
| $Na_2CO_3$ | 13 |
| $Na_2S_2O_3 \cdot 5H_2O$ | 210 |
| $Na_2SO_4$ | 45 |

The washing solution also contains small quantities of nonregenerable vanadate complexes, colloidal vanadium oxysulfides and ADA oxidation products.

Carbon dioxide is bubbled up from the bottom of the cylinder through a sintered glass tube at 1.2 scf/hr. A very light, large-bubbled foam, approximately 2 inches high and visibly low in sulfur content, appears at the surface. The foam is very unstable. When the flow of carbon dioxide is halted, the foam collapses immediately.

To the initial 500 ml of washing solution in the graduated cylinder is added 50 ml of autoclave liquid effluent. This effluent has approximately the same concentrations of those chemicals listed in TABLE I except that the concentrations of $NaS_2O_3 \cdot 5H_2O$ and $Na_2SO_4$ are slightly higher. Also this effluent contains higher concentrations of nonregenerable vanadate complexes, vanadium oxysulfides and ADA oxidation products. Two to three minutes after the autoclave effluent is added to the initial 500 ml of washing solution the foam layer above the liquid surface rises to about four inches. The bubbles become even larger and the sulfur content is even lower.

To the graduated cylinder is now added 5 ml of a 1,000 ppmv aqueous solution of Pluronic L-61. The foam layer collapses immediately. Elemental sulfur particles within the washing solution are observed to markedly increase in size. However, although some of the sulfur particles are observed at the surface of the washing solution, no froth is formed.

A single drop (approximately 0.025 ml) of No. 2-D diesel fuel oil is added to the graduated cylinder. Within one minute a small-bubbled froth, visibly rich in sulfur content, is formed at the surface of the washing solution. Within five minutes this froth has filled the graduated cylinder to overflowing. The froth is quite stable. When the flow of gas is halted, the froth remains intact for several minutes.

EXAMPLE 2

An operating Stretford plant has approximately 110,000 gallons of circulating washing solution containing dissolved chemicals in approximately the same concentrations as those set forth in TABLE I. The plant is producing sulfur product at the rate of approximately 3.5 tons per day.

A large-bubbled foam, low in sulfur content is observed above the washing solution surface in the oxidizer vessel. The resultant inefficiency in the removal of elemental sulfur particles from the oxidizer vessel has caused the concentration of sulfur particles in the washing solution to rise to about 6.5 percent by weight. Pressure drop across the absorber vessel has risen to about 5 p.s.i.

On the first day of the hereinafter described experiment 50 drops per minute (approximately 1,800 ml/day) of a one part Pluronic L-61 and one part diesel fuel oil No. 2-D mixture is added to the circulating washing solution downstream of the oxidizer vessel and upstream of the balance tank. The large-bubbled foam on the surface of the washing solution in the oxidizer tank is observed to be transforming into a small-bubbled froth, much richer in sulfur than was the foam. After about 20 hours, however, the oxidizer is observed to be foaming badly and the addition of diesel and Pluronic L-61 is halted for four hours.

On the second day the volumetric ratio of Pluronic L-61 to diesel oil in the additive mixture is changed to three-to-one and the addition of the mixture to the washing solution is recommenced at 50 drops per minute. A thick, small-bubbled froth, very rich in sulfur, is observed above the surface of the washing solution in the oxidizer vessel.

On the third day the production of sulfur product has risen to more than 5.0 tons per day. The addition rate of the diesel oil-Pluronic L-61 mixture is reduced to 30 drops per minute and then to 20 drops per minute because more sulfur is being removed from the washing solution than can be handled by the froth tank and autoclave. The pressure drop across the absorber vessel has dropped to 3.5 p.s.i.

The diesel oil-Pluronic L-61 mixture addition is continued at 20 drops per minute from the third day through the eighth day. During this six-day period, the sulfur content of the froth averages about 5.3 percent by weight and the concentration of sulfur particles in the circulating washing solution is observed to decrease to 3.8 percent by weight.

After the eighth day, the experiment is deemed completed and mixture addition is terminated. However, residual quantities of diesel oil and Pluronic L-61 remain in the oxidizer vessel for at least seven more days maintaining a highly efficient sulfur particle removal operation and thereby further reducing the concentration of sulfur particles in the washing solution to 1.0 percent by weight.

Having now described the invention, we claim:

1. In a method for removing particles of elemental sulfur from a hydrogen sulfide removal system which employs a regenerable aqueous washing solution, wherein said washing solution is circulated through an oxidizer vessel and therein an oxygen-containing gas is bubbled through said washing solution causing elemental sulfur particles within said washing solution to form an upwardly rising froth above the liquid surface of said washing solution, the improvement comprising:
   (a) admixing said washing solution within said oxidizer vessel with a hydrocarbon consisting essentially of carbon and hydrogen atoms, having a distillation curve with a 90 percent point less than about 680° F. and having a flash point greater than about 100° F.; and (b) admixing said washing solution within said oxidizer vessel with a surfactant which is essentially nonionic and has a first functional component which is partially soluble in water and a second functional component which is partially soluble in said hydrocarbon;
wherein the volumetric ratio of said surfactant to said hydrocarbon within said oxidizer vessel is between about 7:1 and about 1:7.

2. The method defined in claim 1 wherein said hydrocarbon is a mixture of individual compounds.

3. The method defined in claim 1 wherein said hydrocarbon is comprised of a substantial proportion of aliphatic molecules.

4. The method defined in claim 1 wherein said hydrocarbon is a diesel fuel oil as defined by ASTM Designation D975-81, "Standard Specification for Diesel Fuel Oils."

5. The method defined in claim 1 wherein said surfactant is comprised of compounds selected from the class of surfactants which:
 (a) are substantially stable at the conditions existant within the washing solution;
 (b) are substantially innocuous to the oxidation of hydrogen sulfide to sulfur;
 (c) are substantially innocuous to the regeneration of the washing solution with oxygen;
 (d) are substantially innocuous to the recovery of product sulfur; and
 (e) are substantially nonreactive or decomposable within the washing solution except in cases where essentially all products of such reaction and/or decomposition are substantially innocuous to the environment and substantially innocuous to said hydrogen sulfide removal system.

6. The method defined in claim 1 wherein said surfactant comprises a compound selected from the group consisting of:
 (a) a polyoxyethylene condensate represented by the following general formula:

$$R-O-(CH_2-CH_2-O)_n-H,$$

wherein R is the residue of a fatty alcohol, acid, amide or amine having from about 10 to about 18 carbon atoms or an alkyl phenol having from about 10 to about 18 carbon atoms and where n is an integer of 1 or above;
 (b) a compound represented by the following general formula:

$$HO-(CH_2-CH_2-O)_{\overline{a}}(CH-CH_2-O)_{\overline{b}}(CH_2-CH_2-O)_{\overline{c}}H,$$
$$\phantom{HO-(CH_2-CH_2-O)_{\overline{a}}(}CH_3$$

wherein a, b, and c are integers between about 1 and about 100; and
 (c) an ethylene oxide adduct of acetylenic glycols represented by the general formula:

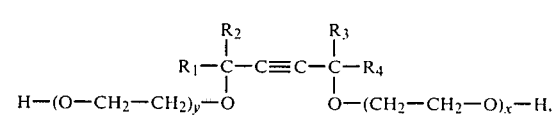

wherein $R_1$ and $R_4$ are the same or different alkyl radicals containing from about 3 to about 10 carbon atoms, $R_2$ and $R_3$ are methyl or ethyl and x and y are integers whose sum is in the range of about 3 to about 60.

7. The method defined in claim 1 wherein said surfactant comprises a compound selected from the group consisting of compounds represented by the following formula:

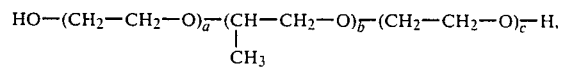

wherein a, b, and c are integers between about 1 and about 100.

8. The method defined in claim 1 wherein the concentration of said hydrocarbon within said oxidizer vessel is between about 2 and about 200 ppmv.

9. The method defined in claim 1 wherein the concentration of said hydrocarbon within said oxidizer vessel is between about 10 and about 100 ppmv.

10. The method defined in claim 1 wherein the concentration of said surfactant within said oxidizer vessel is between about 2 and about 200 ppmv.

11. The method defined in claim 1 wherein the concentration of said surfactant within said oxidizer vessel is between about 10 and about 100 ppmv.

12. The method defined in claim 1 wherein said volumetric ratio of said surfactant to said hydrocarbon within said oxidizer vessel is between about 5:1 and about 1:5.

13. The method defined in claim 1 wherein said volumetric ratio of said surfactant to said hydrocarbon within said oxidizer vessel is between about 2:1 and about 1:2.

14. In a method for removing particles of elemental sulfur from a hydrogen sulfide removal system which employs a regenerable aqueous washing solution, wherein said washing solution is circulated through an oxidizer vessel and therein an oxygen-containing gas is bubbled through said washing solution causing elemental sulfur particles within said washing solution to form an upwardly rising froth above the liquid surface of said washing solution, the improvement comprising:
 (a) admixing said washing solution within said oxidizer vessel with between about 2 and about 200 ppmv of a substantially aliphatic hydrocarbon comprised essentially of carbon and hydrogen atoms, having a distillation curve with a 90 percent point less than about 680° F. and having a flash point greater than about 100° F.; and
 (b) admixing said washing solution within said oxidizer vessel with between about 2 and about 200 ppmv of a surfactant which is nonionic and has a first functional component which is partially soluble in water and a second functional component which is partially soluble in said hydrocarbon, and wherein said surfactant comprises a compound selected from the group consisting of:
 (i) a polyoxyethylene condensate represented by the following general formula:

$$R-O-(CH_2-CH_2-O)_n-H,$$

wherein R is the residue of a fatty alcohol, acid, amide or amine having from about 10 to about 18 carbon atoms or an alkyl phenol having from about 10 to about 18 carbon atoms and where n is an integer of 1 or above;

(ii) a compound represented by the following general formula:

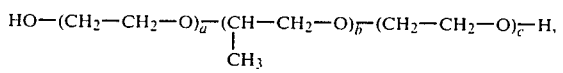

wherein a, b, and c are integers between about 1 and about 100; and (iii) an ethylene oxide adduct of acetylenic glycols represented by the general formula:

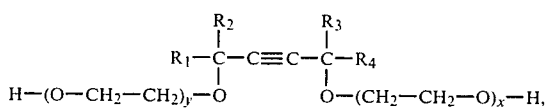

wherein $R_1$ and $R_4$ are the same or different alkyl radicals containing from about 3 to about 10 carbon atoms, $R_2$ and $R_3$ are methyl or ethyl and x and y are integers whose sum is in the range of about 3 to about 60;

wherein the volumetric ratio of said surfactant to said hydrocarbon within said oxidizer vessel is between about 5:1 and about 1:5 and wherein the concentrations of said hydrocarbon and said surfactant are sufficient to maintain an upwardly rising froth above the washing solution surface within said oxidizer vessel which is more than 3 percent sulfur by weight.

15. The method defined in claim 14 wherein said hydrocarbon is a mixture of individual compounds.

16. The method defined in claim 14 wherein said hydrocarbon is a diesel fuel oil as defined by ASTM Designation D975-81, "Standard Specification for Diesel Fuel Oils."

17. The method defined in claim 14 wherein said surfactant comprises a compound selected from the group consisting of compounds represented by the following formula:

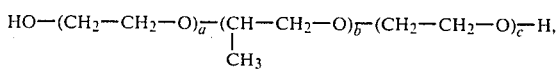

wherein a, b, and c are integers between about 1 and about 100.

18. The method defined in claim 14 wherein the concentration of said hydrocarbon within said oxidizer vessel is between about 10 and about 100 ppmv.

19. The method defined in claim 14 wherein the concentration of said hydrocarbon within said oxidizer vessel is between about 10 and about 50 ppmv.

20. The method defined in claim 14 wherein the concentration of said surfactant within said oxidizer vessel is between about 10 and about 100 ppmv.

21. The method defined in claim 14 wherein the concentration of said surfactant within said oxidizer vessel is between about 10 and about 50 ppmv.

22. The method defined in claim 14 wherein said volumetric ratio of said surfactant to said hydrocarbon within said oxidizer vessel is between about 2:1 and about 1:2.

23. In a method for removing particles of elemental sulfur from a hydrogen sulfide removal system which employs a regenerable, aqueous washing solution, wherein said washing solution is circulated through an oxidizer vessel and therein an oxygen-containing gas is bubbled through said washing solution causing elemental sulfur particles within said washing solution to form an upwardly rising froth above the liquid surface of said washing solution, the improvement comprising:

(a) admixing said washing solution within said oxidizer vessel with between about 10 and about 100 ppmv of a diesel fuel oil as defined by ASTM Designation D975-81, "Standard Specification for Diesel Fuel Oils;" and (b) admixing said washing solution within said oxidizer vessel with between about 10 and about 100 ppmv of a surfactant which is essentially nonionic and has a first functional component which is partially soluble in water and a second functional component which is partially soluble in said hydrocarbon and wherein said surfactant comprises a compound selected from the group consisting of compounds represented by the following formula:

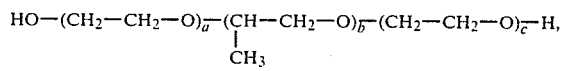

wherein a, b, and c are integers between about 1 and about 100 wherein the volumetric ratio of said surfactant to said hydrocarbon within said oxidizer vessel is between about 2:1 and about 1:2 and wherein the concentrations of said hydrocarbon and said surfactant within said oxidizer vessel are sufficient to maintain an upwardly rising froth above said liquid surface which is more than 4 percent sulfur by weight.

24. The method defined in claim 23 wherein said hydrocarbon is diesel fuel oil No. 2-D as defined by ASTM Designation D975-81, "Standard Specification for Diesel Fuel Oils."

25. The method defined in claim 23 wherein the concentration of said hydrocarbon within said oxidizer vessel is between about 10 and about 50 ppmv.

26. The method defined in claim 23 wherein the concentration of said surfactant within said oxidizer vessel is between about 10 and about 50 ppmv.

* * * * *